(12) United States Patent
Raviv et al.

(10) Patent No.: US 10,425,432 B1
(45) Date of Patent: Sep. 24, 2019

(54) METHODS AND APPARATUS FOR DETECTING SUSPICIOUS NETWORK ACTIVITY

(71) Applicant: EMC IP Holding Company LLC, Hopkinton, MA (US)

(72) Inventors: Kineret Raviv, Herzeliya (IL); Uri Fleyder, Giv'at Shmuel (IL); Eyal Kolman, Tel Aviv (IL); Ofri Mann, Tel-Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 15/192,360

(22) Filed: Jun. 24, 2016

(51) Int. Cl.
*H04L 29/06* (2006.01)

(52) U.S. Cl.
CPC .......... *H04L 63/1425* (2013.01); *H04L 63/14* (2013.01); *H04L 63/1408* (2013.01); *H04L 63/1441* (2013.01)

(58) Field of Classification Search
CPC . H04L 63/14; H04L 63/1408; H04L 63/1425; H04L 63/1441
See application file for complete search history.

(56) References Cited

U.S. PATENT DOCUMENTS

| | | | | |
|---|---|---|---|---|
| 9,419,990 | B2 * | 8/2016 | Levy | H04L 63/1425 |
| 2004/0250169 | A1 * | 12/2004 | Takemori | H04L 63/1425 |
| | | | | 714/38.1 |
| 2008/0271117 | A1 * | 10/2008 | Hamilton | G06F 21/41 |
| | | | | 726/3 |
| 2015/0358338 | A1 * | 12/2015 | Zeitlin | H04L 63/1416 |
| | | | | 726/23 |
| 2015/0373043 | A1 * | 12/2015 | Wang | G06F 21/552 |
| | | | | 706/12 |
| 2016/0021135 | A1 * | 1/2016 | Chesla | H04L 63/02 |
| | | | | 726/23 |

* cited by examiner

*Primary Examiner* — Ashokkumar B Patel
*Assistant Examiner* — Forrest L Carey
(74) *Attorney, Agent, or Firm* — Ryan, Mason & Lewis, LLP (57) ABSTRACT

Methods and apparatus are provided for detecting suspicious network activity, such as in an enterprise network. An exemplary method comprises obtaining network event data for a plurality of user-server communications for a given user, determining a number of distinct servers the user communicated with during a predefined time window; determining a number of distinct servers the user failed in authenticating to during the predefined time window; and assigning a risk score to the user based on the number of distinct servers the user communicated with and the number of distinct servers the user failed in authenticating to during the predefined time window. Generally, the risk score provides a measure of an anomalousness of the user communicating with the number of servers during the predefined time window. An absolute score is optionally assigned based on an evaluation of the number of distinct servers the user communicated with during the predefined time window relative to a predefined threshold number.

20 Claims, 7 Drawing Sheets

1. Data extraction to generate a table of user logins to servers:
   a. Active Directory logs indicate the authentication requests of users to servers and to their personal devices.
   b. Based on these logs, a mapping is derived of user-server communications.
   c. Authentication attempts to non-servers are filtered out.
2. Sampling and profiling:
   a. For data reduction, the data is aggregated.
   b. All the user-server authentication requests within a time window are aggregated.
   c. For each time window, a {user, server, date, result} is stored, where the result indicates whether the authentication was successful or not.
   d. Per each {user, date} pair, two counters are updated:
      i. count_servers - The number of distinct servers the user communicated with during this specific time window.
      ii. count_failed_servers - The number of distinct servers the user failed in authenticating to during this specific time window.

3. Scoring:
   a. Calculate the average of count_servers and count_failed_servers for the user over some training period (default: 90 days):
      i. Count_servers_avg = Average(count_servers)
      ii. Count_failed_servers_avg = Average(count_failed_servers)
   b. Optional scoring functions are:
      i. Scan_score:

$$Scan_{score} = 1 - e^{\left(-0.5\cdot\left(\max\left(\frac{count\_servers}{count\_servers\_avg},1\right)-1\right)\right)}$$

$$failed\_scan_{score} = 1 - e^{\left(-0.5*\left(\max\left(\frac{count\_failed\_servers}{count\_failed\_servers\_avg},1\right)-1\right)\right)}$$

i. Optional Absolute scoring functions are:

$$Abs\_scan_{score} = 1 - e^{\left(-0.5\cdot\left(\max\left(\frac{count\_servers}{daily\_scan\_threshold\_count},1\right)-1\right)\right)}$$

$$Abs\_failed\_scan_{score} = 1 - e^{\left(-0.5\cdot\left(\max\left(\frac{count\_failed\_servers}{daily\_failed\_scan\_threshold\_count},1\right)-1\right)\right)}$$

daily_scan_threshold_count - defaults to: 10
   i. failed_scan_score_vs_group:
   i. The score is the minimal of the two scores – the user-based score and the absolute number-based score:
      1. vanilla_scan_risk_score = min(scan_score, abs_scan_score)
   ii. failed_scan_risk_score = min(failed_scan_score, abs_failed_scan_score)
   iii. Final score is an aggregation of the vanilla and failed scores: final_scan_risk_score = max(vanilla_scan_risk_score, failed_scan_risk_score)

METHODS AND APPARATUS FOR DETECTING SUSPICIOUS NETWORK ACTIVITY

FIELD

The field relates generally to computer security techniques, and more particularly to techniques for detecting suspicious activity in a network, such as an enterprise network.

BACKGROUND

Detecting anomalous activity patterns of users within an internal enterprise network is important for detecting and mitigating attacks. Attackers usually penetrate a secured internal enterprise network wherever they can, and not necessarily where they ultimately wish to be. Hence, attacks often include lateral movement within the enterprise network, which requires investigation of the network by the attacker. This investigation may involve scanning the network structure and servers and, since the attacker is usually unaware to the permissions of the specific user, an unexpected high number of failed authentication attempts to internal servers.

Standard approaches for detecting suspicious communication patterns require explicit information regarding user-server communications obtained, for example, from packet monitoring. This data, however, may not always be available. In addition, standard anomaly detection approaches detect deviations from the regular activity patterns of a user and often provide alerts on irregular but non-risky activities, resulting in a high false alarm rate.

A need therefore exists for improved techniques for detecting suspicious internal activity on an enterprise network.

SUMMARY

One or more illustrative embodiments of the present invention provide methods and apparatus for detecting suspicious network activity, such as in an enterprise network. In one exemplary embodiment of the invention, a method is provided comprising the steps of obtaining network event data for a plurality of user-server communications for a given user; determining a number of distinct servers the user communicated with during a predefined time window; determining a number of distinct servers the user failed in authenticating to during the predefined time window; and assigning a risk score to the user based on the number of distinct servers the user communicated with and the number of distinct servers the user failed in authenticating to during the predefined time window.

In one or more embodiments, the risk score provides a measure of an anomalousness of the user communicating with the number of servers during the predefined time window. The risk score evaluates, for example, (i) the number of distinct servers the user communicated with during the predefined time window, relative to an average number of distinct servers the user communicated with during a predefined training period, and (ii) the number of distinct servers the user failed in authenticating to during the predefined time window, relative to an average number of distinct servers the user failed in authenticating to during the predefined training period.

In at least one embodiment, an absolute score is assigned based on an evaluation of the number of distinct servers the user communicated with during the predefined time window relative to a predefined threshold number. A final risk score of the user is determined, for example, from the risk score and the absolute risk score. For example, the final risk score can be a maximum of a first risk score based on the number of distinct servers the user communicated with during the predefined time window and a second risk score based on the number of distinct servers the user failed in authenticating to during the predefined time window.

The methods and devices of the illustrative embodiments overcome one or more of the problems associated with conventional techniques, and provide adaptive and improved risk assessment for detecting potential computer security attacks. These and other features and advantages of the present invention will become more readily apparent from the accompanying drawings and the following detailed description.

DETAILED DESCRIPTION

Illustrative embodiments of the present invention will be described herein with reference to exemplary communication systems, computing devices, and associated servers, clients and other processing devices. It is to be appreciated, however, that the invention is not restricted to use with the particular illustrative system and device configurations shown.

In one or more embodiments, unusual and/or anomalous activity patterns of a user accessing servers are detected by analyzing, for example, authentication logs, firewall logs and/or packet monitoring information. In one or more embodiments, a risk-based technique is provided that applies anomaly detection over multiple features that describe the regular server access behavior of a user.

In one exemplary embodiment, a "scan" sensor analyzes user-server communications from Windows® authentication logs (e.g., WinEvent) to monitor the attempts of users to access servers and thereby detect risky behavior. The disclosed scan sensor assigns risk scores to user activities, such as an unusual number of logins to servers or an unexpected number of failed logins. In at least one embodiment, the assigned score takes into consideration the normal behavior of the user, a population baseline and the proximity of events. A high user activity risk score indicates a suspicious pattern which may be part of an attack.

In addition, the exemplary embodiment provides adaptive and improved risk assessment by considering both the regular behavior of the user and prior knowledge about risky patterns to significantly reduce the number of false alarms.

One or more embodiments of an exemplary suspicious internal activity detector, as discussed further below in conjunction with FIG. 2, identify suspicious user-server communications based on the communication behavior of the user. The exemplary approach is proactive and can identify risky activity that may be missed by other solutions.

According to one aspect of the invention, automatic and adaptive data-driven detection of suspicious communications is provided. In this manner, new suspicious user-server communications can be detected quickly, without the need for extensive human labor. In at least one embodiment, the exemplary suspicious internal activity detector generates a list of suspicious users, for example, in the form of reports and/or alerts. In addition, once a new suspicious network activity is identified, an analyst can investigate the identified suspicious activity.

As will be described, the present invention, in one or more illustrative embodiments, provides methods and apparatus for detecting suspicious internal network activity to identify suspicious activity. In one or more exemplary embodiments, network event data is analyzed to extract user-server communications. An exemplary detection process 300, as discussed further below in conjunction with FIG. 3, processes the extracted user-server communications and identifies suspicious activity.

Figure 1:
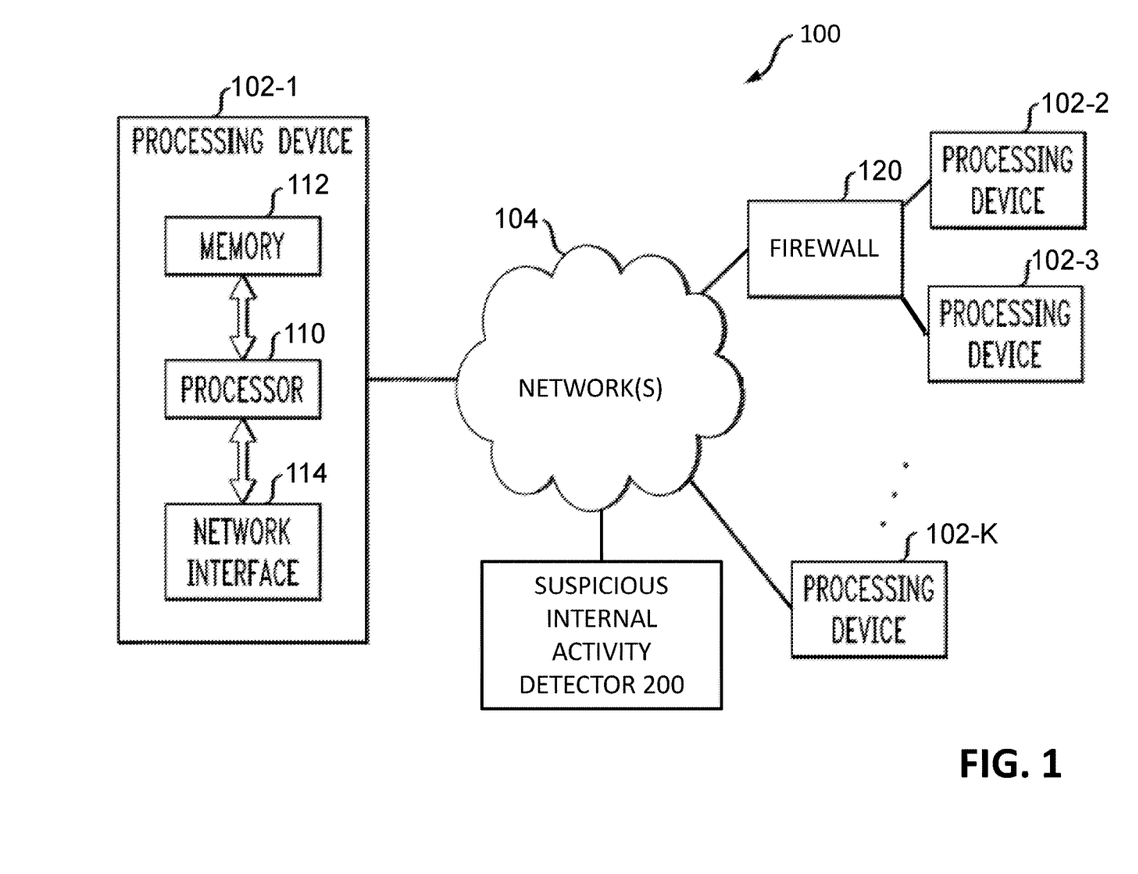
FIG. 1 illustrates an exemplary network environment in which the present invention can be implemented.

FIG. 1 illustrates an exemplary network environment 100 in which the present invention can be implemented. As shown in FIG. 1, the exemplary network environment 100 comprises a plurality of processing devices denoted by 102-1 through 102-K that communicate with one another over one or more networks 104. The network 104 may comprise any type of network, such as a WAN, a LAN, a satellite network, an enterprise network, a telephone or cable network, or various portions or combinations of these and other types of networks.

The exemplary processing device 102-1 comprises a processor 110 coupled to a memory 112. The processor 110 may comprise a microprocessor, a microcontroller, an ASIC, an FPGA or other type of processing circuitry, as well as portions or combinations of such circuitry elements, and the memory 112, which may be viewed as an example of a "computer program product" having executable computer program code embodied therein, may comprise RAM, ROM or other types of memory, in any combination.

Also included in the processing device 102-1 is network interface circuitry 114, which is used to interface the processing device with the network 104 and other system components, and may comprise conventional transceivers.

The other processing devices 102-2 through 102-K are assumed to be configured in a manner similar to that shown for processing device 102-1 in FIG. 1.

As shown in FIG. 1, one or more suspicious internal activity detector 200 are provided, as discussed further below in conjunction with FIG. 2. In addition, one or more of the processing devices 102, such as processing device 102-1, may comprise a server.

One or more of the processing devices 102, such as processing devices 102-2 and 102-3, may be behind a firewall 120 that blocks communications, for example, based on a blacklist. In an enterprise network, enterprise organizations often employ a firewall (or similar network appliance) to restrict network communications for network users to only essential protocols, with the leading one being the Hypertext Transfer Protocol (HTTP). While firewall applications are very effective at blocking or allowing certain types of communications, their ability to detect potential threats inside the allowed protocol is typically limited to signatures and category rule based inspection. With HTTP being extremely popular and used for virtually everything online, it is no surprise that many of the security threats to an organization are from the web, via HTTP.

Thus, one of the most common defense approaches is blocking communications to suspicious domains, for example, using one or more blacklists implemented by one or more firewalls 120. Nonetheless, blacklists are notorious for containing many benign domains (e.g., domains that were malicious years ago) and require a lot of human labor to generate and maintain them. Also, blacklists only contain domains that were manually detected as malicious or suspicious and therefore new malicious or suspicious domains would often not be included in the blacklists.

Organizations that are victims of computer security attacks often aim to identify the attackers and suspicious domains, in an attempt to reduce the business damage, monetary losses and/or damage to the business reputation. Thus, enterprises often employ blacklists to block communications to suspicious domains. The suspiciousness of a domain is typically determined using existing blacklists that are provided by several providers (e.g., Microsoft™, Cisco™, and Checkpoint™). A domain is traditionally marked as malicious, for example, by analyzing malware that communicates with this domain or by signature detection of files downloaded from the site. These methods require human labor, continuous updates, and fail to detect new malicious sites. It is known that even the best domain blacklists contain large amounts of false positives (i.e., benign domains) and therefore cannot be fully trusted, which poses a problem to the security analyst.

In one or more embodiments, a suspicious internal activity detector 200 is provided to identify suspicious user-server communications based on their communication behavior. This approach is proactive and designed to identify risky activity that is likely to be missed by other solutions.

Figure 2:
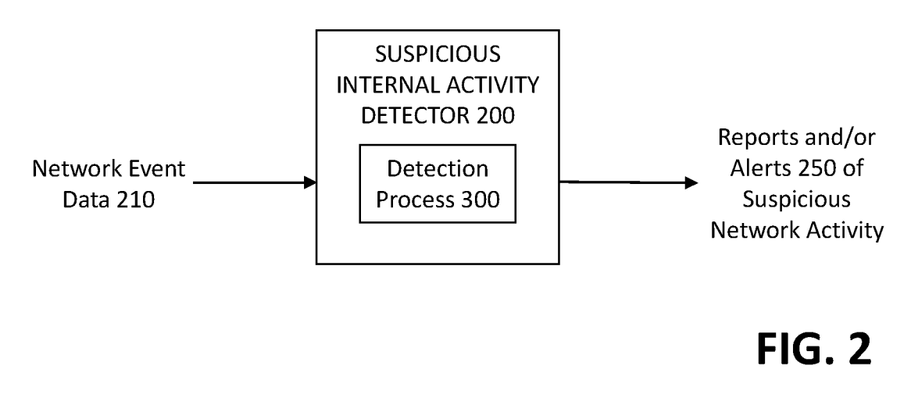
FIG. 2 illustrates an exemplary suspicious internal activity detector of FIG. 1 in accordance with one embodiment of the invention.

FIG. 2 illustrates an exemplary implementation of the suspicious internal activity detector 200 of FIG. 1 in accordance with one embodiment of the invention. The exemplary suspicious internal activity detector 200 may be embodied as any kind of computing device, such as, for example, a personal computer, a workstation, a server, an enterprise server, a laptop computer, a mobile computer, a smart phone, and a tablet computer.

As shown in FIG. 2, the exemplary suspicious internal activity detector 200 processes network event data 210. In one or more embodiments, the exemplary network event data 210 comprises network events that describe connections between users (e.g., by source addresses/username) and internal servers (or destination addresses/host name). As noted above, the network event data 210 may comprise, for example, authentication logs, firewall logs and/or packet monitoring information. As discussed further below, in at least one embodiment, the network event data 210 is processed to extract, from each user-server communication, a username, host name, timestamp and outcome (success/failed).

The exemplary suspicious internal activity detector 200 processes the network event data 210 and implements a detection process 300, as discussed further below in conjunction with FIG. 3, to identify suspicious activity among the user/server communications. The detection process 300 generates reports and/or alerts 250 of suspicious activity. In this manner, the reports and/or alerts 250 allow an analyst to evaluate the activity or to otherwise prioritize the riskiest activity to investigate.

Figure 3:
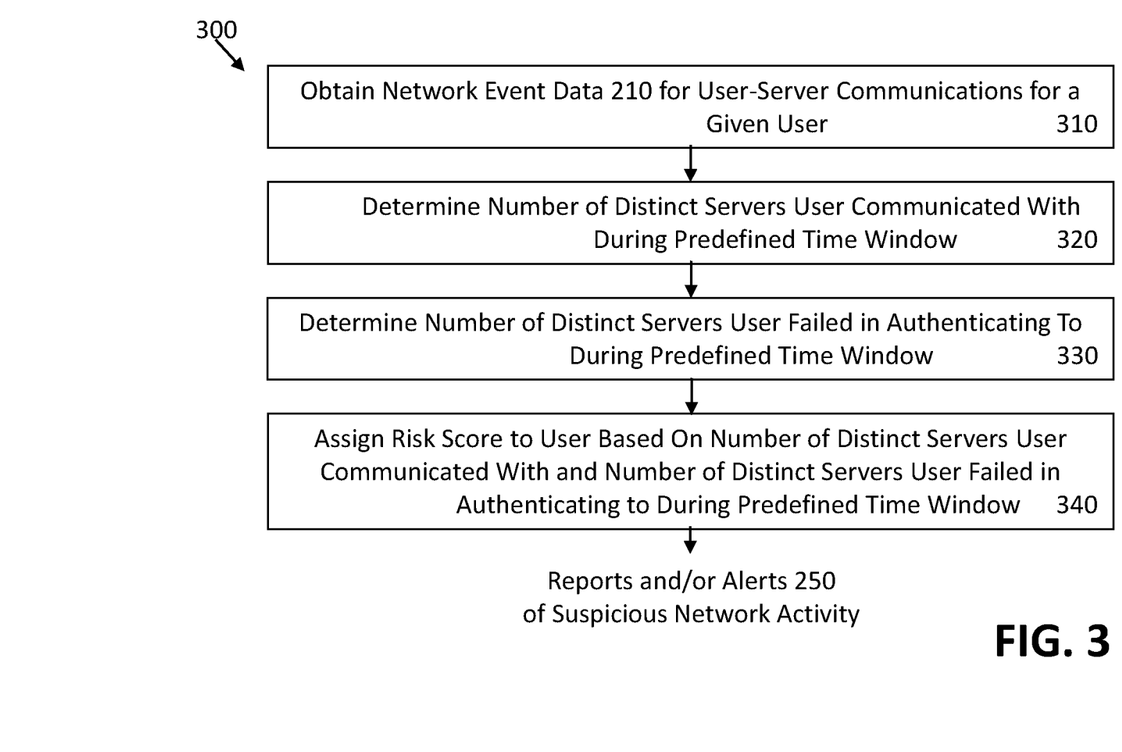
FIG. 3 is a flow chart illustrating an exemplary implementation of the detection process, according to one embodiment of the invention.

FIG. 3 is a flow chart illustrating an exemplary implementation of the detection process 300, according to one embodiment of the invention. As shown in FIG. 3, the exemplary detection process 300 initially obtains network event data 210 during step 310 for user-server communications of a given user. As noted above, the obtained network event data 210 may comprise, for example, authentication logs, firewall logs and/or packet monitoring information, that is processed to extract, from each user-server communication, a username, host name, timestamp and outcome (success/failed).

The exemplary detection process 300 of FIG. 3 determines a number of distinct servers that the user communicated with during a predefined time window (such as one day) during step 320. In addition, a number of distinct servers that the user failed in authenticating to for the predefined time window is also determined during step 330.

As shown in FIG. 3, the exemplary detection process 300 assigns a risk score to the user during step 340 based on the number of distinct servers that the user communicated with during the predefined time window (from step 320) and the number of distinct servers that the user failed in authenticating to during the predefined time window (from step 330). Example scoring measures are discussed further below in conjunction with FIG. 4.

The exemplary detection process 300 generates reports and/or alerts 250 of suspicious network activity as its output.

Figure 4A:
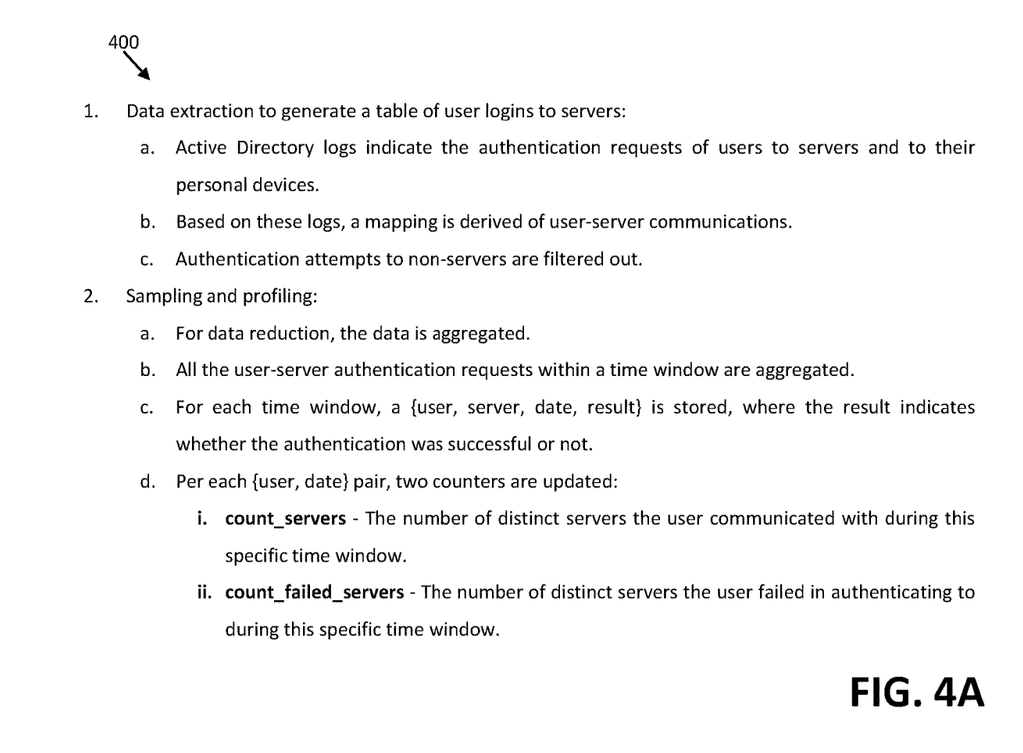
FIGS. 4A and 4B illustrate exemplary pseudo code for the detection process of FIG. 3 according to one embodiment of the invention.
Figure 4B:
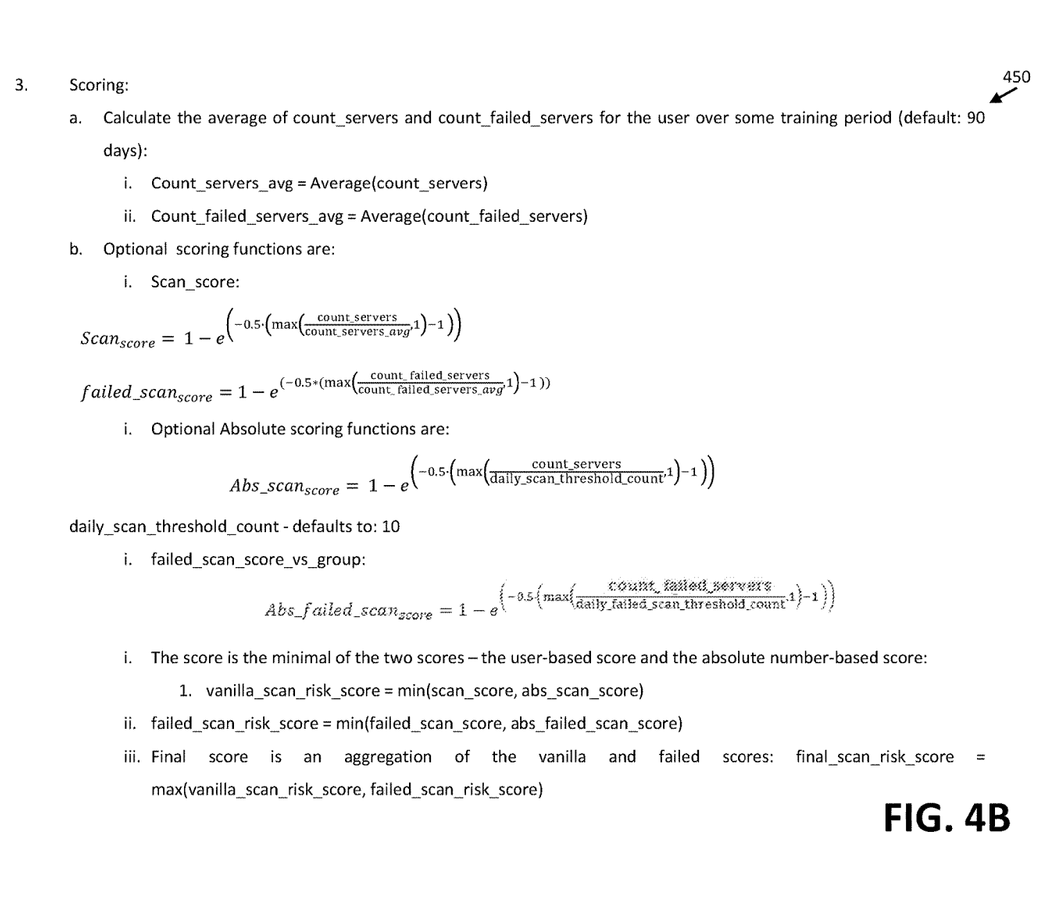

FIGS. 4A and 4B illustrate exemplary pseudo code 400, 450 for the exemplary detection process 300 of FIG. 3 according to one embodiment of the invention. As shown in FIG. 4A, during step 1, data extraction is performed, for example, to generate a table of user login attempts to servers. In one exemplary implementation, Active Directory logs are processed that indicate the authentication requests of users to servers and to their personal devices. Based on these logs, a mapping is derived of user-server communications. Authentication attempts to non-servers are filtered out.

During step 2, sampling and profiling is performed. For data reduction, the data is optionally aggregated during step 2a. The user-server authentication requests within a predefined time window (such one day) are aggregated. For each time window, a (user, server, date, result) is stored, where the result indicates whether or not the authentication was successful.

During step 2d, in the exemplary embodiment of FIG. 4A, two counters are updated for each (user, date) pair:
  count_servers—The number of distinct servers the user communicated with during this specific time window.
  count_failed_servers—The number of distinct servers the user failed in authenticating to during this specific time window.

As shown in FIG. 4B, scoring is performed during step 3. Generally, the score of a user should reflect the anomalousness of this user communicating with this number of servers (successfully or unsuccessfully) during the predefined time period.

The average of count_servers and count_failed_servers for the user over a predefined training period (such 90 days) is calculated during step 3.a.ii, as follows:
  Count_servers_avg=Average(count_servers)
  Count_failed_servers_avg=Average(count_failed_servers)

Generally, in one or more embodiments, the risk score should be high when the number of servers the user communicated with today is much higher than the average number of servers per day. For example, optional scoring functions include:

$$\text{Scan}_{score} = 1 - e^{\left(-0.5 \cdot \left(max\left(\frac{count\_servers}{count\_servers\_avg} \cdot 1\right) - 1\right)\right)}$$

$$\text{failed\_scan}_{score} = 1 - e^{\left(-0.5 * \left(max\left(\frac{count\_failed\_servers}{count\_failed\_servers\_avg} \cdot 1\right) - 1\right)\right)}$$

Additionally, in one or more embodiments, the risk score should be high if the number of communicated servers is high (and low risk if this number is low), regardless of the average number of communicated servers per day. This is achieved by calculating an absolute risk score that relies on the absolute number of communicated servers. For example, optional absolute scoring functions include:

$$\text{Abs\_scan}_{score} = 1 - e^{\left(-0.5 \cdot \left(max\left(\frac{count\_servers}{daily\_scan\_threshold\_count} \cdot 1\right) - 1\right)\right)}$$

where daily_scan_threshold_count has a default value, for example, of 10.

$$\text{Abs\_failed\_scan}_{score} = 1 - e^{\left(-0.5 \cdot \left(max\left(\frac{count\_servers}{daily\_failed\_scan\_threshold\_count} \cdot 1\right) - 1\right)\right)}$$

where daily_failed_scan_threshold_count has a default value, for example, of 5.

In one exemplary implementation, the score is the minimal of the user-based score and the absolute number-based score, as follows:

vanilla_scan_risk_score=min(scan_score,abs_scan_score_group)

failed_scan_risk_score=min(failed_scan_score,abs_failed_scan_score)

In one exemplary implementation, the final score is an aggregation of the vanilla and failed scores, as follows:

final_scan_risk_score=max(vanilla_scan_risk_score, failed_scan_risk_score).

The output of the flow is suspicious users that have irregular behavior of server logins.

One or more exemplary embodiments of the invention allow an organization to focus their response efforts on those suspicious communications that are most likely to be malicious.

Figure 5:
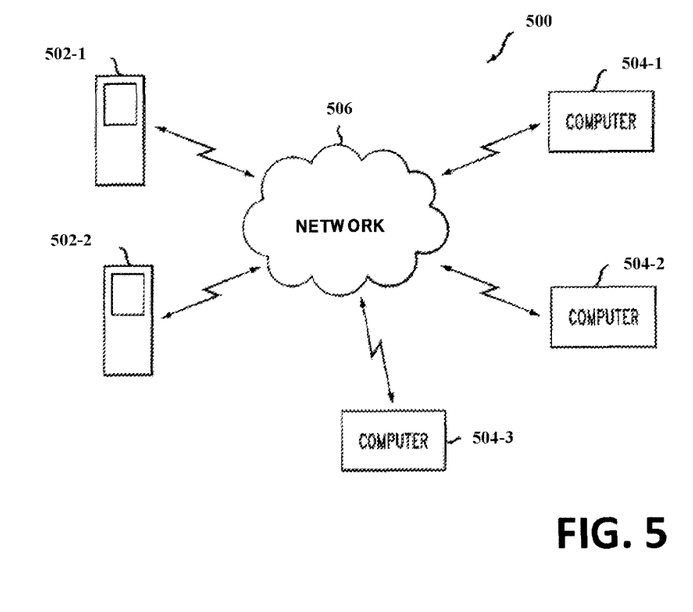
FIG. 5 is a diagram illustrating an example embodiment of communication systems that may incorporate functionality according to one or more embodiments of the invention.

FIG. 5 is a diagram illustrating an example embodiment of communication systems that may incorporate functionality according to one or more embodiments of the invention. As described herein, detection techniques of the type associated with one or more embodiments of the invention may be implemented in a wide variety of different applications. By way merely of illustration, one exemplary communication system application that may incorporate such techniques will now be described with reference to FIG. 5.

As depicted in FIG. 5, a communication system 500 comprises a plurality of mobile devices 502-1 and 502-2 and computers 504-1, 504-2 and 504-3, configured to communicate with one another over a network 506. Any two or more of the devices 502 and 504 may correspond to devices (such as the suspicious internal activity detector 200 in FIG. 1) configured to implement at least one embodiment of the invention, as described herein. It is also to be appreciated, however, that the techniques disclosed herein can be implemented in numerous other applications. For example, while FIG. 5 depicts network 505 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, or other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 6:
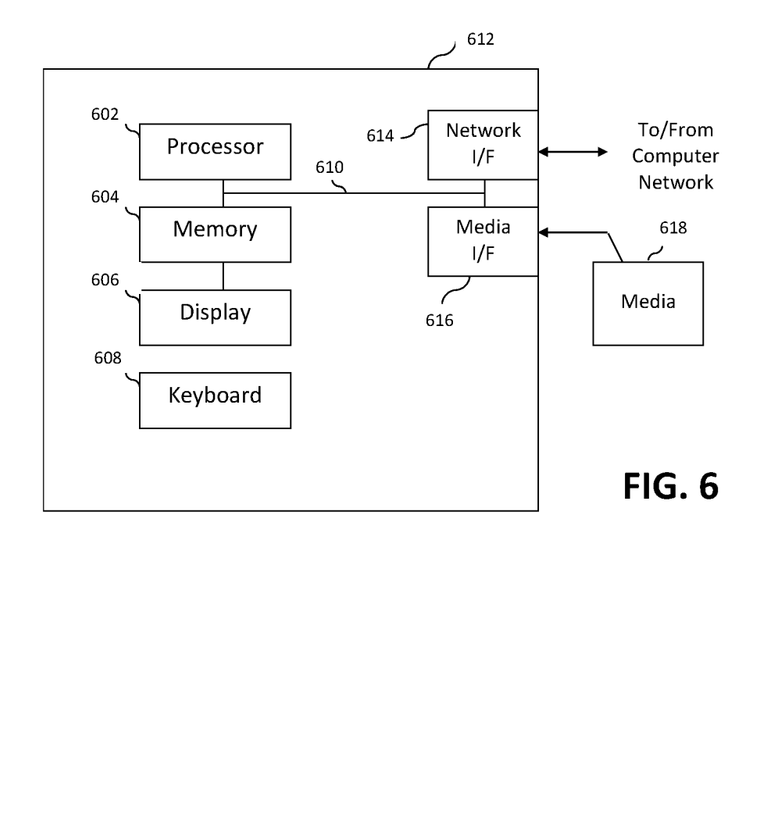
FIG. 6 is a system diagram of an exemplary device on which at least one embodiment of the invention can be implemented.

FIG. 6 is a system diagram of an exemplary device (such as the suspicious internal activity detector 200 in FIGS. 1 and 2, for example) on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 612 as depicted in FIG.

6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from the disclosed suspicious internal activity detection techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    obtaining network event data for a plurality of user-server communications for a given user;
    determining, using at least one processing device, a number of distinct servers said user communicated with during a predefined time window;
    determining, using the at least one processing device, a number of distinct servers said user failed in authenticating to during said predefined time window; and
    assigning, using the at least one processing device, a risk score to said user based on said number of distinct servers said user communicated with and said number of distinct servers said user failed in authenticating to during said predefined time window.

2. The method of claim 1, wherein said risk score provides a measure of an anomalousness of said user communicating with said number of servers during said predefined time window.

3. The method of claim 1, wherein said risk score evaluates (i) said number of distinct servers the user communicated with during said predefined time window, relative to an average number of distinct servers the user communicated with during a predefined training period, and (ii) said number of distinct servers the user failed in authenticating to during said predefined time window, relative to an average number of distinct servers the user failed in authenticating to during said predefined training period.

4. The method of claim 1, wherein said network event data comprises a username, host name, time stamp and outcome of each server login attempt of said user.

5. The method of claim 1, further comprising the step of assigning an absolute score based on an evaluation of said number of distinct servers said user communicated with during said predefined time window relative to a predefined threshold number.

6. The method of claim 5, wherein a final risk score of the user is determined from said risk score and said absolute risk score.

7. The method of claim 1, wherein a final risk score is a maximum of a first risk score based on said number of distinct servers said user communicated with during said predefined time window and a second risk score based on said number of distinct servers said user failed in authenticating to during said predefined time window.

8. A system, comprising:
    a memory; and
    at least one processing device, coupled to the memory, operative to implement the following steps:
    obtaining network event data for a plurality of user-server communications for a given user, determining a number of distinct servers said user communicated with during a predefined time window;

determining a number of distinct servers said user failed in authenticating to during said predefined time window; and assigning a risk score to said user based on said number of distinct servers said user communicated with and said number of distinct servers said user failed in authenticating to during said predefined time window.

9. The system of claim 8, wherein said risk score provides a measure of an anomalousness of said user communicating with said number of servers during said predefined time window.

10. The system of claim 8, wherein said risk score evaluates (i) said number of distinct servers the user communicated with during said predefined time window, relative to an average number of distinct servers the user communicated with during a predefined training period, and (ii) said number of distinct servers the user failed in authenticating to during said predefined time window, relative to an average number of distinct servers the user failed in authenticating to during said predefined training period.

11. The system of claim 8, wherein said network event data comprises a username, host name, time stamp and outcome of each server login attempt of said user.

12. The system of claim 8, further comprising the step of assigning an absolute score based on an evaluation of said number of distinct servers said user communicated with during said predefined time window relative to a predefined threshold number.

13. The system of claim 12, wherein a final risk score of the user is determined from said risk score and said absolute risk score.

14. The system of claim 8, wherein a final risk score is a maximum of a first risk score based on said number of distinct servers said user communicated with during said predefined time window and a second risk score based on said number of distinct servers said user failed in authenticating to during said predefined time window.

15. A computer program product, comprising a non-transitory machine-readable storage medium having encoded therein executable code of one or more software programs, wherein the one or more software programs when executed by at least one processing device perform the following steps:

obtaining network event data for a plurality of user-server communications for a given user;

determining, using at least one processing device, a number of distinct servers said user communicated with during a predefined time window;

determining, using the at least one processing device, a number of distinct servers said user failed in authenticating to during said predefined time window; and assigning, using the at least one processing device, a risk score to said user based on said number of distinct servers said user communicated with and said number of distinct servers said user failed in authenticating to during said predefined time window.

16. The computer program product of claim 15, wherein said risk score provides a measure of an anomalousness of said user communicating with said number of servers during said predefined time window.

17. The computer program product of claim 15, wherein said risk score evaluates (i) said number of distinct servers the user communicated with during said predefined time window, relative to an average number of distinct servers the user communicated with during a predefined training period, and (ii) said number of distinct servers the user failed in authenticating to during said predefined time window, relative to an average number of distinct servers the user failed in authenticating to during said predefined training period.

18. The computer program product of claim 15, further comprising the step of assigning an absolute score based on an evaluation of said number of distinct servers said user communicated with during said predefined time window relative to a predefined threshold number.

19. The computer program product of claim 18, wherein a final risk score of the user is determined from said risk score and said absolute risk score.

20. The computer program product of claim 15, wherein a final risk score is a maximum of a first risk score based on said number of distinct servers said user communicated with during said predefined time window and a second risk score based on said number of distinct servers said user failed in authenticating to during said predefined time window.

* * * * *